C. S. SHARP.
RIDING ATTACHMENT FOR HARROWS.
APPLICATION FILED JULY 1, 1908.
907,185.
Patented Dec. 22, 1908.
2 SHEETS—SHEET 1.
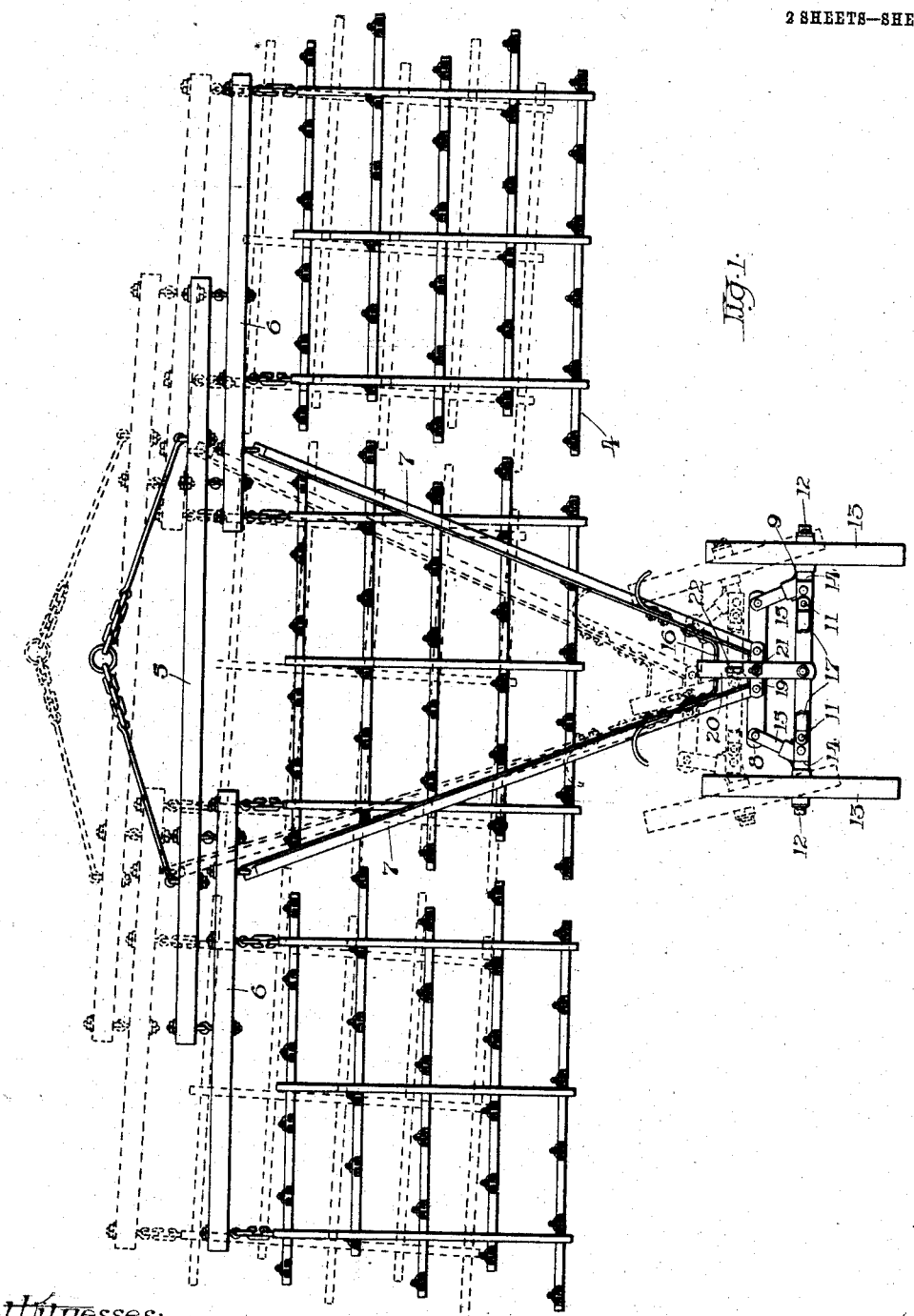
Witnesses:
Inventor
Charles S. Sharp
By
Attorney C. S. SHARP.
RIDING ATTACHMENT FOR HARROWS.
APPLICATION FILED JULY 1, 1908.
907,185.
Patented Dec. 22, 1908.
2 SHEETS—SHEET 2.
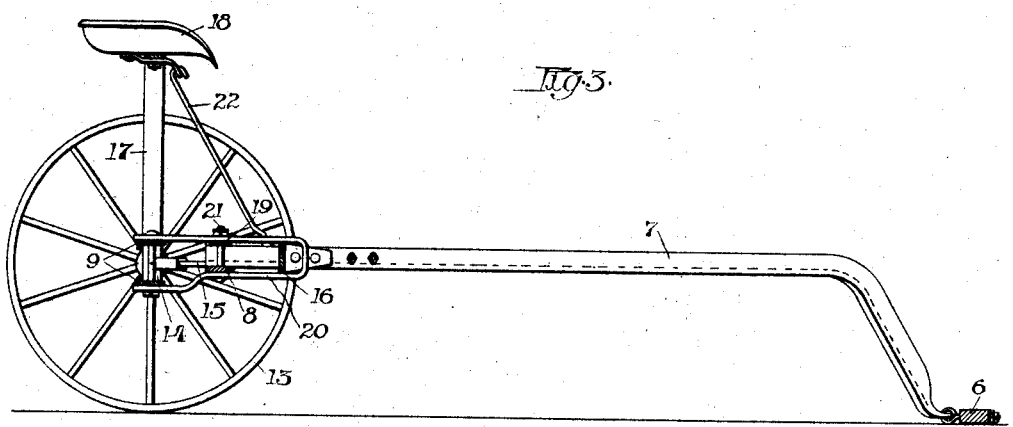
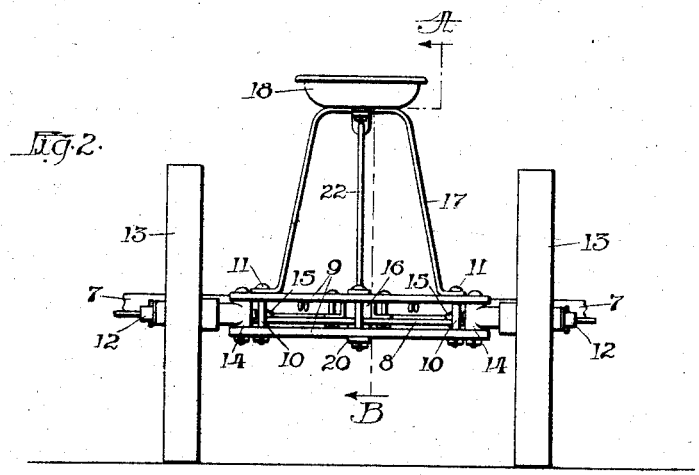
Witnesses:
F. W. Hoffmeister
J. J. Johnson
Inventor.
Charles S. Sharp.
By E. W. Burgess
Attorney.

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

RIDING ATTACHMENT FOR HARROWS.

No. 907,185.     Specification of Letters Patent.     Patented Dec. 22, 1908.

Application filed July 1, 1908. Serial No. 441,331.

*To all whom it may concern:*

Be it known that I, CHARLES S. SHARP, a citizen of the United States, residing at Auburn, in the county of Cayuga and State of New York, have invented certain new and useful Improvements in Riding Attachments for Harrows, of which the following is a specification.

My invention relates to riding attachments for harrows, designed to be attached to the draft members of the harrow and to trail in the rear thereof, the object being to provide an attachment of the kind indicated that may be cheaply constructed, strong and durable and one that will offer a minimum amount of resistance to the forward movement of the harrow. I attain these objects by the mechanism illustrated in the accompanying drawings, in which—

Figure 1 is a top plan view of a harrow showing my improved attachment connected therewith. Fig. 2 is a rear end elevation of the attachment; and Fig. 3 is a side elevation, partly in section, along the line A—B of Fig. 2.

Referring to the drawings, wherein like reference numerals designate like parts throughout the several views, the common form of harrow is designated by the numeral 4, and 5 represents a draft appliance connected therewith by means of draft members 6, having suitable connections with the harrow sections.

7 represents reach bars converging rearward and overhanging the harrow and having their forward ends flexibly connected with the draft members 6, and their rear ends secured to a transverse bar 8 arranged substantially parallel with the draft member 6.

9 is a truck axle comprising upper and lower members spaced apart by means of thimbles 10 and secured together by means of bolts 11.

12 designates journals, upon which are mounted carrying wheels 13, the journals being pivotally connected with opposite ends of the axle by means of vertically arranged hinged joints 14, and having forwardly projecting arms 15, the forward ends of said arms being pivotally connected with opposite ends of the bar 8. A supplemental transverse bar 16 is secured between the reach bars forward of the bar 8 and substantially parallel therewith.

17 represents a seat supporting arch having its leg members secured to the axle member 9, preferably by means of the securing bolts 11, and 18 represents a seat secured to the arch member 17.

The reach bars 7 are preferably made of angle iron, having one of its webs arranged in a vertical plane, and 19 represents a short bar secured to the rear ends of the reach bars by means of the same securing means that connects the transverse bar 8 with said reach bars, the reach bars being clamped between the two transverse members, as shown in Fig. 3.

20 represents a U-shaped yoke having its rear end pivotally connected with said axle member and its middle portion embracing the upper and lower transverse bars 19 and 8 pivotally connected therewith by means of a pivot bolt 21 that is received by longitudinally elongated openings in the upper and lower members of the yoke 20, for the purpose of allowing a slight relative movement between the transverse bars and said yoke. The yoke projects forward from the transverse bars with which it is pivotally connected, and its forward end embraces the transverse member 16 in a manner to prevent any upward or downward flexure of the connections between the reach members and the truck axle.

22 represents a brace member having its upper end pivotally connected with the seat supporting arch, its lower and opposite end pivotally connected with the forward end of the yoke 20.

In the practical operation of the device, when the harrows are turned from the position shown in full lines in Fig. 1 to that shown by dotted lines, the lateral swing of the rear end of the reach bars, operating through the forwardly projecting arms 15, will cause the wheels of the riding attachment to assume the position shown in dotted lines. The yoke 20, swinging about its pivotal connections and frictionally engaging with the bar 16, will thereby slightly oppose a free turning movement of the wheels.

What I claim as my invention, and desire to secure by Letters Patent, is:

1. In a riding attachment for harrows, the combination of a harrow and draft members connected therewith, a truck axle, journals connected with opposite ends of said axle by means of vertically arranged hinged joints, carrying wheels mounted on said journals, forwardly projecting arms forming part of said journals, reach bars having their forward ends connected with said draft members and their rear ends converging and overhanging the harrow, a transversely arranged bar secured to the rear ends of said reach bars and having said forwardly projecting arms pivotally connected therewith, a yoke having its rear end pivotally connected with said axle and its forward end pivotally and slidably connected with said reach bars.

2. In a riding attachment for harrows, the combination of a harrow and draft members connected therewith, a truck axle, journals connected with opposite ends of said axle by means of vertically arranged hinged joints, carrying wheels mounted on said journals, forwardly projecting arms forming part of said journals, reach bars having their forward ends connected with said draft members and their rear ends converging and overhanging the harrow, a tranversely arranged bar secured to the rear ends of said reach bars and having said forwardly projecting arms pivotally connected therewith, a yoke having its rear end pivotally connected with said axle, its middle portion pivotally connected with said transversely arranged bar, and its forward end adapted to slidably engage with said reach bars.

3. In a riding attachment for harrows, the combination of a harrow and draft members connected therewith, a truck axle, journals connected with opposite ends of said axle by means of vertically arranged hinged joints, carrying wheels mounted on said journals, reach bars having their forward ends connected with said draft members and their rear ends converging and overhanging the harrow, a transversely arranged bar secured to the rear ends of said reach bars and having said forwardly projecting arms pivotally connected therewith, a supplemental bar arranged in front of and substantially parallel with said first mentioned bar and secured to said reach bars, a yoke having its rear end pivotally connected with said axle and its forward portion pivotally connected with one of said bars and slidably engaging with the other.

4. In a riding attachment for harrows, the combination of a harrow and draft members connected therewith, a truck axle, journals connected with opposite ends of said axle by means of vertically arranged hinged joints, carrying wheels mounted on said journals, reach bars having their forward ends connected with said draft members and their rear ends converging and overhanging the harrow, a transversely arranged bar secured to the rear ends of said reach bars and having said forwardly projecting arms pivotally connected therewith, a supplemental bar arranged in front of and substantially parallel with said first mentioned bar and secured to said reach bars, a U-shaped yoke having its rear end pivotally connected with said axle, its middle portion pivotally connected with said transversely arranged bar, and its forward end embracing said supplemental bar and adapted to slide thereon.

5. In a riding attachment for harrows, the combination of a harrow and draft members connected therewith, a truck axle, a seat support secured thereto, journals connected with opposite ends of said axle by means of vertically arranged hinged joints, carrying wheels mounted on said journals, forwardly projecting arms forming part of said journals, reach bars having their front ends connected with said draft members and their rear ends converging and overhanging the harrow, a transversely arranged bar secured to the rear ends of said reach bars and having said forwardly projecting arms pivotally connected therewith, a yoke having its rear end pivotally connected with said axle and its forward end pivotally connected with said reach bars, and a brace rod connecting said seat support with the forward end of said yoke.

CHARLES S. SHARP.

Witnesses:
THOS. P. WILEY,
JOSEPH IBBOTSON.